United States Patent Office 3,449,140
Patented June 10, 1969

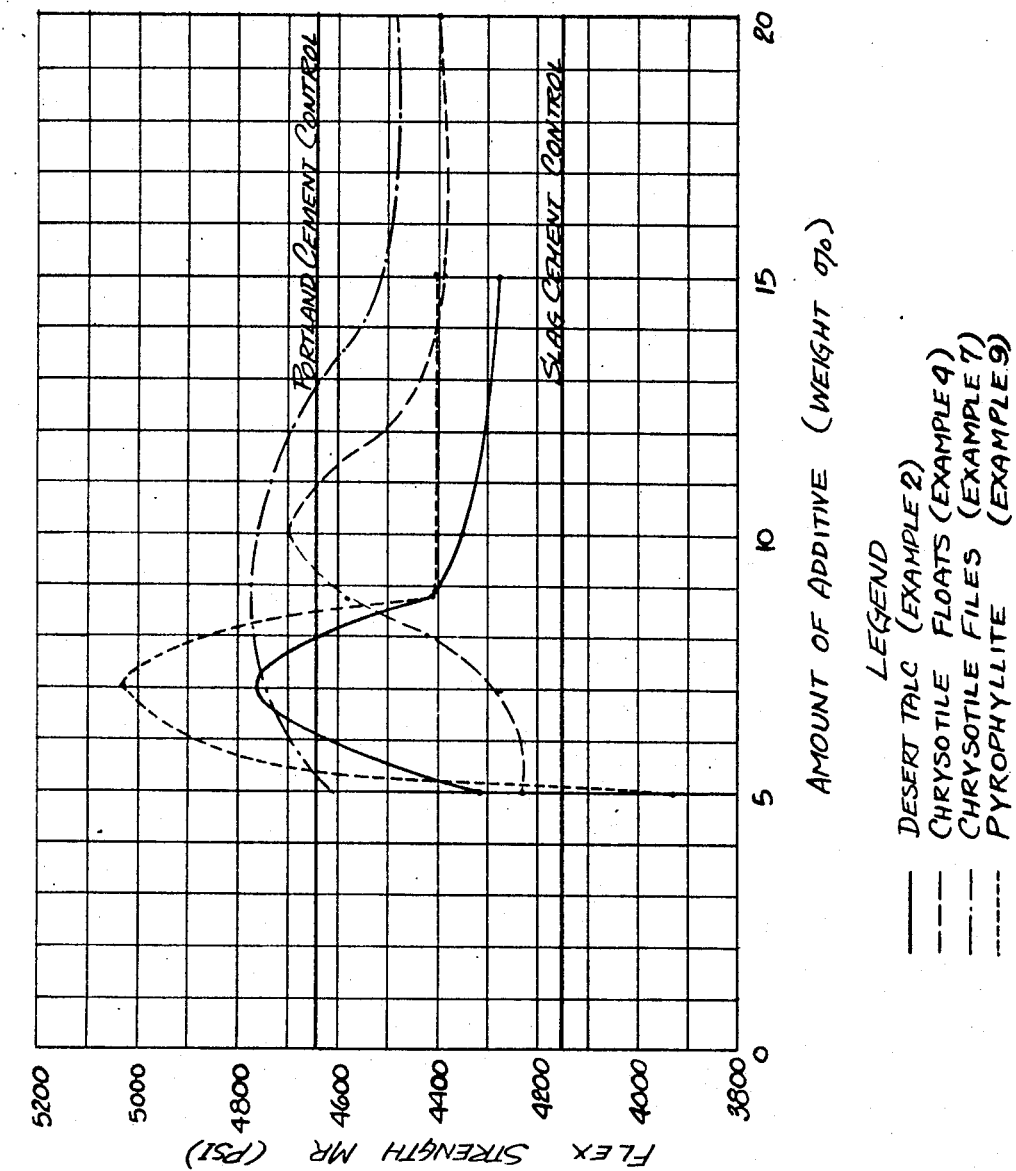

3,449,140
SLAG CEMENT COMPOSITIONS
Julie Chi-Sun Yang, Somerville, N.J., assignor to Johns-Manville Corporation, New York, N.Y., a corporation of New York
Filed Oct. 7, 1965, Ser. No. 493,828
Int. Cl. C04b 7/16
U.S. Cl. 106—117                                    24 Claims

ABSTRACT OF THE DISCLOSURE

Method of increasing the strength of steam cured hydraulic setting slag cement compositions comprising the inclusion therein of finely divided hydrothermally reactive hydrated silicates comprising serpentine, talc, or pyrophyllite, and the strengthened products thereof.

---

This invention relates to an improved hydraulic setting cement, and more particularly to means of increasing the strength of hydraulic setting slag based cements and the improved hydrated compositions and products thereof.

Hydraulic setting slag based cements exhibit a pronounced superiority in resistance to acid attack generally, and in particular to sulfates, over the highly acid susceptible portland type cements wherein lime is liberated during hydration and thereafter, and is thus present to react with any sulfates or other acids available, whereby the resulting formation of calcium sulfate or other acid salts supplants the previously durable calcium silicates of the cement composition with relatively soft calcium salt products and effects an appreciable volume expansion therein which disrupts the structure and integrity of the cement matrix. Moreover, the resultant relatively softer and flaky calcium sulfates and the like acid salts readily erode away from the area affected, and due thereto and the extensive volume increase or expansion entailed in the change of composition or formation of calcium sulfate, etc. salts which ruptures and separates the monolithic structure of the initial cement and fragments the same, the destructive action of the acids or disintegration is progressive and autogenic in further exposing underlying surfaces or new areas to acid attack with the ultimate degradation or destruction of the overall structure or article. This deficiency of portland type cements is particularly significant and pernicious in structures or articles subject to extensive exposure to acids such as sulfates, as in the case of sewer pipe or any structure placed in aggressive soils or surroundings.

Moreover, in portland cement products designated for applications entailing contact with acids and thus provided with protective coatings of resins, asphalts and the like, as for example resin line sewer or "chemical" asbestos-portland cement pipe, any defect in the application of the protective coating or subsequent break or formation of even a minute opening therein which permits access of acids and their contact with the underlying portland cement composition, although initially only a very limited or insignificant area, produces an interposed volume expansion whereby the substratal cement carrying the surface protective coating heaves and separates the coating from the underlying cement base furthering the access of the aggressive attacking agent, and in turn inciting the autogenous progressive destruction of the protective coating and the ultimate destruction of the cement composition and product thereof.

Notwithstanding the decided susceptibility to acid degradation and failure of portland cement compositions in significant fields of application such as sewer pipe or conduits handling acid- or sulfate-containing waters, etc., and in areas of aggressive acid ground or ambient conditions, hydraulic setting slag based cement compositions with their attendant high resistance to acids and the lasting durability under such conditions have not achieved any noteworthy acceptance even for application in this critical area of conditions where portland cements are decidedly wanting. This bypassing or reluctance to employ hydraulic setting slag based cement compositions in services wherein durability under acid conditions is a definite consideration and they provide significantly improved resistance, apparently is primarily attributable in large part to the generally overall lower or inferior strength properties of hydraulic setting slag cement compositions in relation to portland cement compositions.

It is the principal object of this invention to provide hydraulic setting slag based cement admixtures or products, which upon steam cure induced, hydrothermal reaction thereof, provide a hydrated cementitious material or composition of improved resistance to sulfates and acids, or aggressive acid conditions, and also of improved physical strength comparable to or better than portland cement or other slag cement compositions commensurately steam cured.

It is a further object of this invention to provide an economical hydraulic setting slag based cement preparation which is amenable to the manufacture of common asbestos-cement products comprising pipe, shingles, panels and the like, by means of conventional techniques and apparatus, and produces acid resistant products thereof of high mechanical strength upon subjecting to normal steam curing conditions.

It is also an object of this invention to provide low cost means of enhancing the mechanical strength of slag-based cements and thereby overcome the primary obstacle to their acceptance and wide use in many areas wherein their superior chemical resistance is desirable.

It is a still further object of this invention to provide novel and improved hydraulic slag-based cementitious compositions which possess superior chemical and physical properties over those of prior slag or portland-type hydraulic cement compositions.

These and other objects and advantages of this invention will become apparent from the following detailed description and annexed drawing.

The figure of the drawing comprises a graph showing the improved mechanical strengths obtainable in chemically resistant slag-based cementitious materials through the means of this invention and gives the conditions effecting the optimum strength properties therein which are comparable to and frequently exceed those of the conventional portland-type cement.

This invention comprises the discovery that certain finely divided, high surface area or natural mineral forms of specific hydrated silicates apparently accelerates and further hydrothermal reactions, or possibly incite added hydrothermal reactions, during steam cure induced hydrothermal hydration or setting of given hydraulic slag-based cement admixtures comprising ground granulated blast furnace slag, calcium silicate, and preferably silica, thereby extend the bonding system and significantly increasing the physical strength properties in the resultant steam propagated hydration set compositions, or products thereof.

The vitalizing hydrated silicate additaments of this invention which have been found to impart enhanced mechanical strength to the defined class of slag-based cements consists of finely divided—typically less than about $-325$ mesh—and/or high surface area—preferably greater than about 10,000 cm.$^2$/g.—hydrothermally reactive forms of silicates of serpentine, talc, and pyrophyllite, or combinations thereof.

In detail this invention comprises new steam or hydrothermally propagated cementitious reaction products of significantly greater mechanical strengths produced principally from granulated metalurgical slags with relatively smaller quantities of hydrolyzable calcium silicates as a source of calcium oxide to incite and propel the decomposition of the slag, enabling its reaction and production of bonding gels, and preferably a source of hydrothermally reactive silica. The invention further entails the essential means or method of achieving the foregoing cementitious reaction products of improved strength through the introduction and combining with other reactants of given amounts of a class of vitalizing silicates, as well as the novel potential cementitious slag admixtures which, upon hydrothermal reaction, produce the hydrated cements of enhanced properties. The relative amounts of the principal or basic ingredients of the cementitious materials in which the means of the invention are found to be significantly effective and apt quantities of the silicate additament to achieve the advantages of this invention, in aproximate parts by weight of the dry admixture, comprise 12.5 to 85 parts of a suitable metalurgical slag more fully described hereinafter, 0.25 to 32 parts of a hydraulic reactive calcium silicate material effectively provided by a typical portland cement, and optionally, but highly desirably, a source of hydrothermally reactive silica preferably with an available silica content of at least about 5 up to about 75 parts.

In the manufacture of asbestos-cement articles, a familiar class of products and common manufacturing process for which this invention and the means thereof are particularly adaptable, the asbestos fiber or other like mineral fibers reinforcement content may range up to 50 parts by weight and should be at least about 5 parts by weight of the dry cementitious admixture. A preferred and typical cementitious slag admixture of this invention consists, in approximate parts by weight of the dry mixture, of 20 to 50 parts of an apt metallurgical slag, 3 to 20 parts of a suitable calcium silicate or source thereof such as portland cement, 10 to 50 parts of hydrothermally reactive silica, and 10 to 40 parts of a mineral fiber reinforcement.

The vitalizing hydrothermally reactive form of silicates of this invention are introduced into such hydraulic reacting slag cementitious admixtures in amounts of at least 2 up to about 20 and preferably about 5 to 15 percent by weight of the total dry cementitious admixture. Although not required, it is considered to be desirable to add the silicate components of this invention at the expense of or in place of a like weight or amount of the silica. Thus a typical and recommended formulation for the wet manufacture, e.g. the so-called "Hatschek" process as illustrated in U.S. Letters Patent No. 769,087 and Re. No. 12,594, of common asbestos-cement articles such as pipe, would consist, in approximate percentages by weight based upon the overall dry admixture or stock furnish, of 20% asbestos fiber, 30% metallurgical slag, 10% calcium silicate (portland cement), 25 to 35% silica, and 5 to 15% of fine high surface area hydrated silicates selected from the group consisting of serpentine, talc, and pyrophyllite.

The principal component of the slag cement admixtures of this invention comprises granulated or quenched blast furnace slag, or slags from similar metallurgical processes which are of a glassy nature, that is, not oriented in structure and preferably containing no more than 15% thereof of crystalline structures. The slag should be ground to a size having a specific surface area of approximately 3000 to 7500 cm.$^2$/g. as derived by the Blaine test to facilitate the hydration reaction. Several cementitious slag products produced from ordinary water quenched blast furnace slag exemplary of those suitable for use in this invention gave the following analysis:

|  | A | B | C | D | E |
|---|---|---|---|---|---|
| Ignition Loss (at 1,000° F.) | 0.47 | 0.55 |  |  | [1] 1.7 |
| $SiO_2$ | 26.7 | 27.8 | 30.3 | 34.3 | 33.3 |
| CaO | 45.3 | 44.3 | 41.6 | 43.1 | 39.2 |
| MgO | 4.2 | 3.4 | 4.1 | 6.3 | 12.3 |
| $Al_2O_3$ | 11.8 | 12.0 | 14.4 | 10.2 | 10.7 |
| $TiO_2$ | 0.56 | 0.56 | 0.54 | 0.4 | 0.28 |
| $Fe_2O_3$ | 0.83 | 1.3 | 0.86 | 2.28 | 0.72 |
| $P_2O_5$ | 0.43 | 0.45 | 0.10 | 0.15 | 0.009 |
| $Na_2O$ | 0.56 | 0.45 | 0.34 | 0.19 | 0.19 |
| $K_2O$ | 0.49 | 0.53 | 1.1 | 0.19 | 0.17 |
| Total $SO_3$ | 7.5 | 6.9 | 5.92 | 0.09 | 0.22 |
| S-- | 0.89 | 0.91 | 0.95 | 1.41 | 1.2 |
| Trace materials ($B_2O_3$, BaO, $Mn_2O_3$) | 0.3 | 0.3 |  |  | 0.8 |
| Total, percent | 100.0 | 99.9 | 100.21 | 100.21 | 100.79 |

[1] At 1,800° F.

The calcium silicate component comprises anhydrous or hydrated calcium silicate compounds having a solubility in water sufficient to provide at least approximately 0.1 and preferably about 0.2 or more grams of CaO per liter. The source of calcium silicate should be highly basic in nature whereby it will effectively attack the glassy slag particles to incite and propagate the decomposition of the slag particles rendering the ingredients thereof available for reaction and formation of high bonding strength gels. Apt materials for this required function comprise hydrolyzable calcium silicates high in lime, viz., calcium silicates having a $CaO-SiO_2$ mol. ratio of at least about 2 moles of lime per mole of silica, and desirably consist of the preferred tricalcium silicate, or $\beta$-dicalcium silicate, or compositions which readily provide such materials in aqueous media. Ordinary portland cements comprising up to about 70% by weight thereof of tricalcium silicates and $\beta$-dicalcium silicate, for example, constitute an economical and effective source or means of supplying these materials in the preferred, water soluble, high lime containing tricalcium silicate and in the alternative $\beta$-dicalcium silicate forms.

The highly desirable and normally included silica component may comprise any of the usually hydrothermally reactive forms of silica, including siliceous materials such as fine sand, diatomaceous earth, quartz, silica gel, tripoli, etc., and mixtures thereof. The inclusion of silica is particularly desirable in order to augment the usually inadequate quantities of silica available from the slag and calcium silicate compositions required for the formation of cementitious gels of maximum strength properties.

Asbestos fiber, or the like inorganic fibers comprising glass, mineral wool, etc., which, according to all indications and commonly accepted knowledge of the art, play no part in the hydration or setting of cementitious compositions, or the chemistry involved therein, provide an effective mechanical reinforcement throughout the cementitious materials which is required for sufficient service strength in many articles of limtied mass such as building panels, pipe, shingles, etc. As such the inorganic fibrous reinforcement of this invention serves the ordinary, although frequently necessary, strengthening function as in common asbestos-portland cement compositions, or products thereof.

The steam propagated, hydraulic setting or curing slag cementitioius admixtures or materiaIus to which this invention applies, may comprise other components which do not materially effect or modify the basic ingredients or their hydrothermal reactions and products thereof. Common auxiliary components include, of course, inert fillers or additives, which may comprise aggregates or particles of too large a size or limited surface area to permit entering into the hydrothermal reactions, coloring pigments as are often utilized in panel or structural sheets and shingles, conventional accelerators or retarders, air entraining agents etc.

The fundamental or vitalizing agents of this invention which, when applied to typical cementitious slag admixes in accordance with the precepts of the invention, are responsible for marked increases in the mechanical strength of steam propagated hydration set slag cements rendering such otherwise relatively weak but chemically resistant slag cements comparable to or better than corresponding portland cement compositions in physical strength, comprises certain naturally occurring or mineral hydrous magnesium and/or aluminum silicates, or simulated synthetic products therefor having comparable surface areas and structures or physical makeup as well as like chemical compositions. The natural materials comprise serpentine minerals, talc, and pyrophyllite, or mixtures thereof and the like hydrous magnesium and/or aluminum silicates having fibrous, flaky or scaly forms or structures, or in the case of some pyrophyllite varieties a needle or granular structure makeup, which provides high or maximum unit surface area as opposed to a massive or continuous particle size or construction. Apparently beyond the chemical consideration, it is the fibrous, platy or flaky, etc. construction or cleavage, or in other words, very high surface area which enables these normally insoluble hydrous silicates to enter into the hydrothermal reaction with the components of the given slag cementitious admixtures wherein they incite and facilitate or accelerate the hydrothermal reactions and gel formation providing the strength imparting bonding matrixes or systems. Moreover, it is a further prerequisite that these natural materials of high surface area, or synthetic equivalent thereof, be of a relatively small particle or unit size to participate in the steam indurating reaction with the slag, calcium silicate and other apt reactive ingredients as is evidenced by the absence of like or commensurate effects from the common inclusion of asbestos fiber of typical reinforcing fiber sizes in such slag cementitious admixtures when exposed to the same steam curing conditions. Effective particle surface area, of course, depends to a degree upon the nature of the particular mineral structure makeup however, surface areas in the order of 10,000 to 40,000 $cm.^2/g.$ have been established as highly effective and particle sizes of substantially all less than about −325 mesh. A convenient and economical source of apt materials of fine particle size comprises serpentine asbestos fines, tailings, or floats, further reduced in size if required, or fines and dusts of any of the given agents.

Steam actuating or hydrothermal conditions effective with the hydraulic slag cementitious admixtures and hydrous silicate agents of this invention which produce hydrothermally set or cured slag cement compositions or structures of high chemical resistance and improved mechanical strength properties comprise relatively high temperature autoclaving conditions ranging from at least about 150° C. up to about 250° C. or higher (approximately 55 to 565 p.s.i.) over periods of at least about 6 hours up to 24 hours or greater, with the time of hydrothermal reaction generally inversely proportioned to the intensity of the temperature and pressure conditions. Typical hydrothermal reaction conditions comprise about 170° C. (approximately 100 p.s.i.) for approximately 16 hours.

The following examples illustrate the present invention including the application of several different hydrous silicate agents within the scope of the invention, as applied to different slag cement compositions. The properties of the products of this invention are further compared with those of the prior art to demonstrate the advantages of this invention and point out the optimum conditions thereof enabling the formation of highly chemical resistant slag cement compositions possessing mechanical strengths surpassing those of conventional portland cement compositions. It is to be understood that the examples hereinafter set forth are given for the purpose of illustration rather than limitation and that specific constituents included therein, reaction conditions applied thereto, compositions produced therefrom, and the techniques or procedures set forth are merely exemplary and are not to be construed to limit this invention to any particular means of practicing the same.

Several natural hydrous silicates of the class of this invention were added in the given various proportions to the typical slag cementitious admixture identified, and upon hydration and autoclaving the strength properties of each were determined and compared with a like prepared and autoclaved slag cement of the same basic composition without and additive and common portland cement of similar formulation as standards. All specimen samples were similarly prepared and set or hydrated, comprising a cure for 24 hours in a humidity chamber at room temperature (70° F.) at 100% relative humidity, then autoclaved at 170° C. under 100 p.s.i. for 16 hours. The portland cement standard consisted of 50% by weight of portland cement, 30% by weight of silica flour (sand), and 20% by weight of reinforcing chrysotile asbestos fiber (Group No. 4, Q.A.M.A. Std.); and the slag cement standard consisted of 30% by weight of ground granulated slag (St. Louis slag of the composition hereinafter set forth in the slag composition table), 10% by weight of portland cement as the source of calcium silicate, 40% by weight of silica flour (sand), and 20% by weight of reinforcing crysotile asbestos fiber (Group No. 4). The composition and size classification of the finely divided natural hydrous silicate vitalizing additives are given in the following table.

TABLE I.—COMPOSITIONS OF THE HYDROUS MAGNESIUM AND ALUMINUM SILICATE ADDITIVES

| Additive | Ignition Loss (1,000 C.) | Moisture (105 C.) | SiO₂ | MgO | CaO | Al₂O₃ | Fe₂O₃ | TiO₂ | Na₂O | K₂O | X-ray Data | Particle Size or Surface Area Ground Sample |
|---|---|---|---|---|---|---|---|---|---|---|---|---|
| Desert talc | 5.5 | | 57.9 | 28.2 | 4.9 | 0.36 | 0.17 | 0.02 | 1.7 | 0.83 | Talc | −325 mesh. |
| Serpentine (Jeffrey mine) [1] | 12.4 | 0.99 | 33.5 | 38.4 | 0.01 | 0.5 | 14.3 | 0.05 | 0.03 | 0.07 | Serpentine | −325 mesh. |
| Chrysotile (asbestos floats) | 13.0 | 0.88 | 38.2 | 40.3 | 0.53 | 1.5 | 6.8 | 0.07 | 0.08 | 0.01 | | 12,200 $cm.^2/g.$ |
| Chrysotile tailings (Jeffrey mine) [1] | 12.9 | 0.77 | 37.0 | 37.2 | 0.56 | 2.0 | 9.4 | 0.05 | 0.11 | 0.20 | [3] | 16,000 $cm.^2/g.$ |
| Chrysotile fines (Coalinga mine) [2] | 14.2 | 1.50 | 39.0 | 41.0 | 0.48 | 0.46 | 5.3 | 0.03 | 0.10 | | | 88,000 $cm.^2/g.$ |
| Chrysotile tailings (Coalinga mine) [2] | 16.3 | 1.30 | 36.7 | 39.2 | 0.70 | 0.80 | 5.0 | 0.08 | 0.01 | | | 36,500 $cm.^2/g.$ |
| Pyrophyllite (N. Carolina) | 2.1 | | 79.0 | 0.02 | | 15.0 | 0.2 | 0.10 | 0.5 | 2.2 | [4] | −325 mesh. |
| Silvery talc | 25.2 | 0.1 | 28.0 | 23.2 | 20.7 | 0.9 | 0.4 | 0.11 | 0.23 | 0.54 | [5] | −325 mesh. |

[1] Asbestos, Quebec.
[2] Coalinga, California.
[3] Serpentine chrysotile magnetite.
[4] Pyrophyllite, quartz.
[5] About 15% talc, dolomite, tremolite.

In Examples 1 through 9 the stated amount of hydrous silicate additive was included as a replacement for an equivalent amount by weight of the silica of the above slag cement formulation given as the standard.

The amount of each additive of the Examples 1 through 9 incorporated into the basic slag cement formulation in lieu of a comparable amount of silica and the flexural strength of the resulting autoclaved and hydrated, or hydrothermally reacted cementitious composition produced therefrom, along with the like prepared and tested or determined flexural strengths of the basic slag cement formulation and the portland as standard, are all given in the following Table II.

and 20% by weight of reinforcing chrysotile fiber (Group No. 4), and the slag cement formulation for the stand- TABLE II.—FLEXURAL STRENGTH OF EXEMPLARY COMPOSITIONS OF THIS INVENTION AND OF THE STANDARDS

| Example | | Flexural Strength MR (p.s.i.) | | | | | | | |
|---|---|---|---|---|---|---|---|---|---|
| | Additive Replacing Silica (1%) | 0 | 5 | 7 | 8.75 | 10 | 12-12.5 | 15 | 20 |
| | St. Louis Slag Cement Control | 4,140 | | | | | | | |
| | Portland Cement Control | 4,650 | | | | | | | |
| 1 | Jeffrey Serpentine (ball milled) | 4,310 | | 4,375 | | | 4,340 | 4,160 | |
| 2 | Desert talc | 4,310 | 4,770 | 4,410 | 4,350 | | 4,320 | 4,270 | 3,870 |
| 3 | Silvery talc | 4,560 | 4,235 | | 4,660 | | | 4,400 | |
| 4 | Asbestos floats | 4,240 | 4,270 | 4,580 | 4,700 | | 4,310 | 4,390 | 4,395 |
| 5 | Jeffrey asbestos tailings | 4,420 | | 4,040 | 4,520 | | 4,155 | 4,250 | |
| 6 | Chrysotile floats | 4,570 | 4,580 | | 4,400 | | 4,180 | | |
| 7 | Coalinga fines | 4,610 | | 4,760 | 4,615 | | 4,640 | 4,500 | 4,490 |
| 8 | Coalinga tailings | 4,780 | 4,570 | | 4,635 | | | 4,820 | |
| 9 | Pyrophyllite | 3,925 | 5,040 | | 4,410 | | | 4,410 | |

The effects of varying amounts of select additives comprising those of Examples 2, 4, 7 and 9 upon flexural strength in relation to the standards are plotted in the graph comprising the drawing to illustrate the optimums of each type of hydrous silicate additives of the class of this invention, and demonstrate the means of the invention for producing slag cement of mechanical strength exceeding that of portland cement.

The following examples demonstrate the effectiveness of this invention when applied to hydraulic slag cements composed of a number of different ground granulated metallurgical slags of a broad range of compositions. These metallurgical slag compositions are set forth in Table III.

ards, each containing one of the foregoing identified metallurgical slag compositions, was 30% of one of the respective slag compositions, 10% by weight of portland cement as a source of calcium silicate, 40% by weight of silica (sand flour) and 20% by weight of reinforcing chrysotile asbestos fiber (Group No. 4). The particular hydrous silicate additives of this invention were substituted for an equivalent amount of the silica content in Examples 10, 11 and 12, and in Example 13 the silicate additive was substituted for a like amount of the slag itself. In all cases the specimen samples were prepared and hydrated under identical conditions comprising a cure for 24 hours at room temperature (about 70° F.) and

TABLE III.—CHEMICAL COMPOSITION OF SLAGS

| | Slag | | | | |
|---|---|---|---|---|---|
| | A | B | C | D | E |
| Composition | U.S. Steel Corp. South Works Plant, Ill. | St. Louis Slag Product Co. St. Louis, Mo. | Courtesy of (Dr. Stutterheim) Pretoria, South Africa | Courtesy of (Dr. Stutterheim) Pretoria, South Africa | Building Binders Ltd. South Africa |
| | Ignition loss (1,800° F.) | | | | |
| | Gain | Gain | Gain | Gain | Gain |
| $SiO_2$ | 34.3 | 39.8 | 35.4 | 28.7 | 35.0 |
| $Al_2O_3$ | 10.2 | 9.16 | 10.3 | 18.6 | 12.1 |
| $CaO$ | 43.1 | 40.2 | 34.1 | 30.5 | 35.3 |
| $MgO$ | 6.3 | 5.1 | 14.6 | 17.9 | 13.4 |
| $TiO_2$ | 0.4 | 1.1 | 0.40 | 0.34 | 0.45 |
| $Fe_2O_3$ | 2.3 | 0.27 | 0.20 | 0.60 | 0.36 |
| $Mn_2O_3$ | 1.6 | 0.5 | 0.46 | 0.32 | 0.86 |
| $Na_2O$ | 0.19 | 0.72 | 0.24 | 0.23 | 1.45 |
| $K_2O$ | 0.19 | 0.93 | 1.2 | 0.2 | 0.86 |
| $S$ | 1.41 | 1.20 | 0.9 | 0.2 | 0.76 |
| $SO_3$ | 0.09 | 0.03 | + | + | 0.19 |
| $P_2O_5$ | 0.15 | 0.02 | 0.01 | 0.02 | 0.04 |
| Total | 100.23 | 99.03 | 97.81 | 97.61 | 100.77 |
| $CaO/SiO_2$ | 1.26 | 1.01 | 0.96 | 1.06 | 1.00 |

The flexural strength of hydrated slag cements respectively consisting of one of each of the foregoing slag compositions and of a similarly formulated portland cement are given as standards and the flexural strengths of the same slag cement containing the additives of this invention are all set forth in Table IV. As before, the portland cement formulation was typical, i.e., 50% by weight of portland cement, 30% by weight of silica (sand flour), relative humidity of 100%, followed by autoclaving for 16 hours at 170° C. and 100 p.s.i. The various metallurgical slag compositions utilized in the slag cement admixtures and the hydrous silica additives of this invention and their relative proportions of addition together with the resultant flexible strength of these compositions of this invention and other standards are all given in Table IV.

TABLE IV.—EFFECTS OF THE HYDROUS SILICA ADDITIVES OF THIS INVENTION UPON THE PHYSICAL STRENGTH OF VARIOUS SLAG CEMENTS

| Example No. | Slag | A | B | C | D | E |
|---|---|---|---|---|---|---|
| | Blaine Finess (cm.²/g.) | 3,650 | 5,000 | 4,820 | 6,640 | 7,000 4,500 |
| | | Flexural Strength MR (p.s.i.) | | | | |
| | Portland Cement Control | 4,650 | | | | |
| | Slag Cement Control | 4,120 | 4,210 | 4,050 | 3,500 | 3,480 |
| 10 | Desert Talc (ballmilled), 5% | 4,310 | | | | |
| | Desert Talc (ballmilled), 7% | 4,770 | 4,710 | 4,500 | 3,890 | |
| | Desert Talc (ballmilled), 12% | 4,520 | 4,820 | 4,570 | 4,080 | |
| 11 | Pyrophyllite (ballmilled), 7% | 5,040 | 4,590 | 4,290 | | |
| 12 | Chrysotile fines, 10-12% | 4,480 | 4,550 | 4,010 | | 4,010 |
| | (Coalinga Mine), 15-18% | 4,800 | 4,185 | | | 4,185 |
| 13 | Desert Talc (ballmilled), 5% | 4,980 | 4,510 | 4,440 | 4,170 | |
| | Desert Talc (ballmilled), 10% | 4,880 | 4,280 | 4,340 | 3,820 | |
| | Desert Talc (ballmilled), 20% | 3,870 | 3,540 | 3,600 | | |

It will be understood that the foregoing details are given for purposes of illustration and not restriction, and that variations within the spirit of this invention are to be included within the scope of the appended claims.

What I claim is:

1. A hydraulic setting slag cement admixture of improved steam propagated hydration set strength properties, consisting essentially, in approximate parts by weight, of:

(a) Ground granulated blast furnace slag ___ 12.5–85.0
(b) Calcium silicate _____ 0.25–32.0
(c) Silica _____ 7–75 and containing approximately 2 to approximately 20 percent by weight of the total dry cement admixture, of at least one finely divided hydrothermally reactive hydrated silicate selected from the group consisting of serpentine, talc, and pyrophyllite.

2. The hydraulic setting slag cement admixture of claim 1 containing reinforcing inorganic fiber in amount up to approximately 50 parts by weight of the dry cement admixture.

3. The hydraulic setting slab cement admixture of claim 1 wherein the source of the calcium silicate content consists of portland cement.

4. A hydraulic setting slag cement admixture of improved steam propagated hydration set strength properties, consisting essentially, in approximate parts by weight, of:

(a) Ground granulated blast furnace slag _____ 20–50
(b) Calcium silicate _____ 3–20
(c) Silica _____ 10–50 and containing approximately 5 to approximately 15 percent by weight of the total dry cement admixture of at least one finely divided hydrothermally reactive hydrated silicate selected from the group consisting of serpentine, talc, and pyrophyllite.

5. The hydraulic setting slag cement admixture of claim 4 containing approximately 10 to approximately 40 parts by weight of the dry cement admixture of reinforcing asbestos fiber.

6. The hydraulic setting slag cement admixture of claim 5 wherein the source of the calcium silicate content consists of portland cement.

7. A hydraulic setting slag cement admixture of improved steam propagated hydration set strength properties, consisting essentially, in approximate parts by weight, of:

(a) Ground granulated blast furnace slag _____ 30
(b) Calcium silicate _____ 10
(c) Silica _____ 40
(d) Asbestos fiber _____ 20 and containing approximately 5 to approximately 15 percent by weight of the total dry cement admixture of at least one finely divided hydrothermally reactive hydrated silicate selected from the group consisting of serpentine, talc, and pyrophyllite.

8. The hydraulic setting slag cement admixture of claim 7 wherein the source of the calcium silicate content comprises portland cement.

9. A steam cured hydrated slag cement composition of improved strength properties, comprising the hydrothermal reaction products of autoclaving a hydraulic setting slag cement admixture consisting essentially, in approximate part by weight of the dry cement admixture, of:

(a) Ground granulated blast furnace slag ____ 12.5–85
(b) Calcium silicate _____ 0.25–32
(c) Silica _____ 0–75 and approximately 2 to approximately 20 percent by weight of the total dry cement admixture of at least one finely divided hydrothermally reactive hydrated silicate selected from the group consiting or serpentine, talc, and pyrophyllite.

10. The steam cured hydrated slag cement composition of claim 9 wherein the hydrothermal reaction product contains inorganic reinforcing fiber in amount up to approximately 50 parts by weight of the initial dry cement admixture.

11. The steam cured hydrated slag cement composition of claim 10 wherein the source of the calcium silicate content comprises portland cement.

12. A steam cured hydrated slag cement composition of improved strength properties, comprising the hydrothermal reaction products of autoclaving a hydraulic setting slag cement admixture consisting esesntially, in approximate parts by weight of a dry cement admixture, of:

(a) Ground granulated blast furnace slag _____ 20–50
(b) Calcium silicate _____ 3–20
(c) Silica _____ 10–50 and approximately 5 to approximately 20 percent by weight of the total dry cement admixture of at least one finely divided hydrothermally reactive hydrated silicate selected from the group consisting of serpentine, talc, and pyrophyllite.

13. The steam cured hydrated slag cement composition of claim 12 wherein the hydrothermal reaction products contain approximately 10 to approximately 40 parts by weight of the dry cement admixture of reinforcing asbestos fiber.

14. The steam cured hydrated slag cement composition of claim 13 wherein the source of the calcium silicate content comprises portland cement.

15. A steam cured hydrated slag cement composition of improved strength properties, comprising the hydrothermal reaction products of autoclaving a hydraulic setting slag cement admixture consisting essentially, in approximate parts by weight of the dry cement admixture, of:

(a) Ground granulated blast furnace slag _____ 30
(b) Calcium silicate _____ 10
(c) Silica _____ 40
(d) Asbestos fiber _____ 20 and approximately 5 to approximately 15 percent by weight of the total dry cement admixture of at least one finely divided hydrothermally reactive hydrated silicate selected from the group consiting of serpentine, talc, and pyrophyllite.

16. The steam cured hydrated slag cement composition of claim 13 wherein the source of the calcium silicate content comprises portland cement.

17. A method improving the steam propagated hydration set strength properties of hydraulic setting slag cements consisting of the hydrothermal reaction products of steam curing a hydraulic setting slag cement admixture consisting essentially, in approximate parts by weight of a dry cement admixture, of:

(a) Ground granulated blast furnace slag ____ 12.5–85
(b) Calcium silicate _____ 0.25–32
(c) Silica _____ 0–75 the improvement comprising combining with the said hydraulic setting slag cement admixture at least one finely divided hydrothermally reactive hydrated silicate selected from the group consisting or serpentine, talc, and pyrophyllite in amount of approximately 2 to approximately 20 percent by weight of the total dry cement admixture.

18. The improved method of claim 17 wherein the hydraulic setting slag cement admixture contains reinforcing inorganic fiber in an amount up to approximately 50 parts by weight of the total dry cement admixture.

19. The improved method of claim 18 wherein the source of the calcium silicate content comprises portland cement.

20. A method of improving the steam propagated hydration set strength properties of hydraulic setting slag cements consisting of the hydrothermal reaction products of steam curing a hydraulic setting a slag cement admixture consisting essentially, in approximate parts by weight of the dry cement admixture, of:

(a) Ground granulated blast furnace slag _____ 20–50
(b) Calcium silicate _____ 3–20
(c) Silica _____ 10–50 the improvement comprising combining with the said hydraulic setting slag cement admixture at least one finely divided hydrothermally reactive hydrated silicate selected from the group consisting of serpentine, talc, and pyrophyllite in amount of approximately 5 to approximatey 20 percent by weight of the total dry cement admixture.

21. The improved method of claim 20 wherein the hydraulic setting slag cement admixture contains approximately 10 to approximately 40 parts by weight of the total dry cement admixture of reinforcing asbestos fiber.

22. The improved method of claim 21 wherein the source of the calcium silicate content comprises portland cement.

23. A method of improving the steam propagated hydration set strength properties of hydrauic setting slag cements consisting of the hydrothermal reaction products of steam curing a hydraulic setting slag cement admixture consisting essentially in approximate parts by weight of the dry cement admixture, of:

(a) Ground granulated blast furnace slag _____ 30
(b) Calcium silicate _____ 10
(c) Silica _____ 40
(d) Asbestos fiber _____ 20 the improvement comprising combining with the said hydraulic setting slag cement admixture at least one finely divided hydrothermally reactive hydrated silicate selected from the group consisting of serpentine, talc, and pyrophyllite in amount of approximately 5 to approximately 15 percent by weight of the dry cement admixture.

24. The improved method of claim 23 wherein the calcium silicate content comprises portland cement.

References Cited
UNITED STATES PATENTS

| | | | |
|---|---|---|---|
| 2,991,186 | 7/1961 | Furlan | 106—98 |
| 3,202,522 | 8/1965 | Yang et al. | 106—99 |

JAMES E. POER, *Primary Examiner.*

PO-1050
(5/69)

UNITED STATES PATENT OFFICE
CERTIFICATE OF CORRECTION

Patent No. 3,449,140            Dated June 10, 1969

Inventor(s) JULIE CHI-SUN YANG

It is certified that error appears in the above-identified patent and that said Letters Patent are hereby corrected as shown below:

Column 2, line 58, "accelerates" should read --accelerate--. Column 3, line 59, "769,087" should read --769,078--. Column 3, line 72, "no more than 15%" should read --no more than about 15%--. Column 4, line 57, "limtied" should read --limited--. Column 4, line 64, "cementitioius" should read --cementitious--. Column 5, line 1, "admixes" should read --admixtures--. Column 6, line 27, "and additive" should read --any additive--. Column 9, line 12, "7-75" should read --0-75--. Column 9, line 23, "siab" should read --slag--. Column 9, line 66, "part" should read --parts--. Column 9, line 74, "or" should read --of--. Column 10, line 12, "esesntially" should read --essentially--. Column 10, line 45, "consiting" should read --consisting--. Column 10, line 50, after "method" insert --of--. Column 10, line 63, "or" should read --of--. Column 11, line 22, "hydrauic" should read --hydraulic--.

SIGNED AND
SEALED
APR 28 1970

(SEAL)
Attest:

Edward M. Fletcher, Jr.
Attesting Officer

WILLIAM E. SCHUYLER, JR.
Commissioner of Patents